US007954446B2

(12) United States Patent
Nakane et al.

(10) Patent No.: US 7,954,446 B2
(45) Date of Patent: Jun. 7, 2011

(54) HOPPER FOR CLEANING COATING MACHINE

(75) Inventors: Shinichi Nakane, Aichi (JP); Takao Ueno, Aichi (JP); Koji Sakuraba, Aichi (JP)

(73) Assignee: Trinity Industrial Corporation, Aichi (JP)

( * ) Notice: Subject to any disclaimer, the term of this patent is extended or adjusted under 35 U.S.C. 154(b) by 597 days.

(21) Appl. No.: 11/814,864

(22) PCT Filed: Dec. 15, 2005

(86) PCT No.: PCT/JP2005/023032

§ 371 (c)(1), (2), (4) Date: Oct. 4, 2007

(87) PCT Pub. No.: WO2006/080155

PCT Pub. Date: Aug. 3, 2006

(65) Prior Publication Data

US 2009/0038660 A1 Feb. 12, 2009

(30) Foreign Application Priority Data

Jan. 27, 2005 (JP) ................................. 2005-019006

(51) Int. Cl.
*A23G 3/26* (2006.01)

(52) U.S. Cl. ...... 118/17; 239/589; 239/543; 118/DIG. 5

(58) Field of Classification Search .................. 239/589, 239/543; 118/DIG. 5
See application file for complete search history.

(56) References Cited

U.S. PATENT DOCUMENTS

| | | | | |
|---|---|---|---|---|
| 4,427,367 | A * | 1/1984 | Yagisawa | 431/354 |
| 6,557,781 | B2 * | 5/2003 | Kon | 239/224 |
| 6,739,071 | B2 * | 5/2004 | Andis et al. | 34/96 |

FOREIGN PATENT DOCUMENTS

| | | |
|---|---|---|
| JP | 57-169467 | 10/1982 |
| JP | 2000-189849 | 7/2000 |
| JP | 2003-001148 | 1/2003 |
| JP | 2003001148 A * | 1/2003 |

OTHER PUBLICATIONS

Translation of JP 2003001148A.*
Translation of JP 2003001148A Aug. 25, 2010.*

* cited by examiner

*Primary Examiner* — Parviz Hassanzadeh
*Assistant Examiner* — Albert Hilton
(74) *Attorney, Agent, or Firm* — Greenblum & Bernstein P.L.C.

(57) ABSTRACT

A hopper for cleaning a coating machine in which a rotary atomizing head extends through an opening in the upper surface of a hopper housing, a thinner for cleaning the rotary atomizing coating machine and a residual coating material are sprayed on the inside, an airstream control member for preventing flow from ascending from the inside of the housing to the outside of the housing through a gap between the coating machine and the opening by the rotation of the rotary atomizing head corresponding to the gap between the coating machine and the opening, and the control member is formed with an air vent hole for supplying air to a negative pressure zone formed just below the rotary atomizing head.

3 Claims, 4 Drawing Sheets

HOPPER FOR CLEANING COATING MACHINE

TECHNICAL FIELD

The present invention concerns a hopper for cleaning a coating machine in which a rotary atomizing head is entered through an opening formed in the upper surface of a hopper housing and spraying a residual coating material or a thinner at the inside thereof upon cleaning a rotary atomizing coating machine by supplying the thinner.

BACKGROUND ART

Since an electrostatic rotary atomizing coating machine can finely particulate a coating material uniformly and conduct coating uniformly and at high quality, it is generally used also for coating of automobiles requiring stringent coating quality.

In the coating line for such automobiles, since automobile bodies as works are conveyed successively irrespective of coating colors, it is adapted such that coating materials of a plurality of colors can be coated under color change by a single coating machine so that respective works can be coated with designated coating colors.

By the way, in a case of color-change coating from a coating material of a preceding color to a coating material of a succeeding color, since color mixing is caused when coating is applied with the coating material of the succeeding color to result in coating failure unless the coating material of the preceding color remaining in the coating machine is cleaned, cleaning for color-change is conducted on every time.

Since a thinner and air are alternately supplied to a coating machine upon conducting cleaning for color-change and the coating material remaining in the coating machine and the coating material of a preceding color deposited to a rotary atomizing head are removed thoroughly, color mixing does not occur.

In this case, a hopper used for cleaning a coating machine is disposed and the coating machine is cleaned in the inside thereof for preventing the residual toner or the thinner from being sprayed as coating mists from the rotary atomizing head, scattering and depositing to works.

FIG. 7 shows such an existent cleaning hopper 31, in which an opening 33 for entering an rotary atomizing head B of a coating machine T, is formed to the upper surface of a hopper housing 32, and a residual coating material and a thinner are sprayed in the hopper housing 32 upon cleaning the coating machine T by supplying the thinner.

[Patent Document 1] JP-A No. 2000-189849

In this case, since particles of the residual coating material particulated by the rotary atomizing coating machine are extremely fine and extremely light, they tend to undergo the effect of a surrounding airstream.

Particularly, it has been well known that when the rotary atomizing head B is rotated at a high speed, an airstream therearound is disturbed and the coating material whirling up through a gap G between the coating machine T and the opening 33.

Accordingly, a shaping air SA is sprayed from the coating machine T for preventing sprayed coating material particles from whirling up during cleaning.

However, use of the shaping air SA results in a loss of energy by so much, as well as the shaping air SA generates another airstream depending on the case and the coating material particles sometimes whirl up under the effect thereof.

In view of the above, the present inventors have analyzed the airstream formed at the periphery of the coating machine in a case of not using the shaping air.

FIG. 8 is a model of an airstream and it was found that when air around a rotary atomizing head B is rotated into a rotational flow $Q_{31}$ by the rotation of the rotary atomizing head B, a negative pressure zone 34 is formed below the rotary atomizing head B by the centrifugal force thereof and a primary ascending airstream $Q_{32}$ is formed from below to above toward the negative pressure zone 34, air therearound forms a secondary ascending airstream $Q_{33}$ under the effect of the primary airstream $Q_{32}$ to form an upward vortex flow $Q_{34}$ while rotating along the coating machine T undergoing the effect of the rotational flow $Q_{31}$, and the vortex flow $Q_{34}$ causes the coating material particles to whirl up.

Accordingly, if it is possible to eliminate the vortex flow $Q_{34}$, since airstream flowing from the inside of the hopper housing 32 outwardly passing through the gap G between the coating machine T and the opening 33 is eliminated, it is considered that upward whirling of the coating material particles is to be eliminated.

DISCLOSURE OF THE INVENTION

Subject To Be Solved By the Invention

In view of the above, it is a technical subject of the present invention to enable to conduct cleaning without causing a coating material to whirl up through a gap between a coating machine and an opening without using shaping air upon cleaning the coating machine by supplying a thinner to the coating machine and rotating the rotary atomizing head at a high speed in a cleaning hopper.

Means For the Solution of the Subject

For solving the subject described above, the present invention provides a hopper used for cleaning a coating machine in which a rotary atomizing head is entered through an opening formed to the upper surface of a hopper housing and a residual coating material and a thinner are sprayed to the inside thereof upon supplying the thinner for cleaning to the rotary atomizing coating machine characterized in that an airstream control member for shutting a flow ascending from the inside of the housing to the outside of the housing passing through a gap between the coating machine and the opening by the rotation of the rotary atomizing head is disposed so as to situate below the rotary atomizing head corresponding to the gap between the coating machine and the opening, and the control member is formed with an air vent hole for supplying air to a negative pressure zone formed just below the rotary atomizing head.

Effect of the Invention

According to the hopper used for cleaning a coating machine of the invention, when the rotary atomizing head of the coating machine is entered through the opening of the hopper housing and rotated at a high speed, air around the rotary atomizing head is rotated and a negative pressure zone is formed by a centrifugal force thereof below the rotary atomizing head, and an ascending airstream directing from below to above passing through the air vent hole of the airstream control member to the negative pressure zone is formed.

In this case, since the flow of the surrounding air ascending undergoing the effect of the ascending airstream is shut by the airstream control member, a vortex flow directed upward while rotating along the body of the coating machine is not formed.

That is, since air around the rotary atomizing head is rotated in a space between the hopper housing and the airstream control member by the rotation of the rotary atomizing head and this forms a negative pressure zone at a central area while spreads outward under the effect of the centrifugal force and air is supplied continuously to the negative pressure zone, the supplied air rotates in a space between the hopper housing and the airstream control member to form a flow spreading outwardly by the centrifugal force.

In this case, since the airstream control member is disposed so as to close the gap between the coating machine and the opening, the stream directing upward along the coating machine is shut, a vortex flow directing upwardly while rotating along the body of the coating machine is not formed, but air between the hopper housing and the airstream control member rotates so as to spread outwardly. Accordingly, air flows slightly from the outside of the hopper housing inwardly through the gap between the coating machine and the opening, and the coating material particles do not whirl up and scatter to the outside through the gap.

As descried above, this provides an excellent effect that upward whirling of the coating material particles can be prevented reliably with an extremely simple constitution of providing the airstream control member in the hopper without blowing out the shaping air.

Best Mode For Practicing the Invention

In this embodiment, a subject of reliably preventing upward whirling of coating material particles without blowing out the shaping air could be attained by an extremely simple constitution of only providing the airstream control member in the hopper.

FIG. 1 is an explanatory view showing a hopper for cleaning a coating machine according to the present invention, FIG. 2 is an explanatory view showing flows of air therein, FIG. 3 is an explanatory view showing another embodiment, FIG. 4 is an explanatory view showing flows of air therein, FIG. 5 is an exploded assembling view showing a further embodiment, and FIG. 6 is a side elevational view thereof.

EMBODIMENT 1

A hopper 1 used for cleaning a coating machine shown in FIG. 1 is used for cleaning a rotary atomizing coating machine T by supplying a thinner thereto in which a rotary atomizing head B is entered through an opening 3 formed to the upper surface of a hopper housing 2, and a residual coating machine and a thinner are sprayed at the inside thereof.

In the hopper housing 2, an airstream control plate (airstream control member) 4 is disposed so as to situate below the rotary atomizing head B corresponding to a gap G between the coating machine T and the opening 3 which is formed upon entering the rotating atomizing head B into the hopper 1. The control plate 4 is formed as an annular shape with an air hole 5 being formed at the center, and air is supplied passing through the air vent hole 5 to a negative pressure zone 6 formed just below the rotary atomizing head B by the rotation thereof from a portion therebelow.

In this embodiment, the outer diameter of the control plate 4 is made larger than the inner diameter of the opening 3 and the inner diameter of the air vent hole 5 is made smaller than the outer diameter of the rotary atomizing head B, so that the gap G between the coating machine T and the opening 3 is closed by the airstream control plate 4.

The airstream control plate 4 disposed corresponding to the gap G is not necessarily restricted to the case formed so as to close the gap G but the shape and the form thereof are not restricted so long as an airstream flowing through the gap G to the outside is not formed as a result although not completely closing the gap G.

FIG. 2 is an explanatory view showing the flow of air in a case of providing the airstream control plate 4.

When the rotary atomizing head B is entered in the hopper 1 and rotated at a high speed, since a rotational flow $Q_1$ in which air around the rotary atomizing head B rotates is formed and a negative pressure zone 6 is formed just below the rotary atomizing head B by the centrifugal force thereof, a primary ascending airstream $Q_2$ directing to the negative pressure zone 6 passing through the air vent hole 5 of the airstream control plate 4 is formed and since air is supplied continuously from the primary ascending airstream $Q_2$ to the negative pressure zone 6, the rotational flow $Q_1$ is not eliminated.

Then, the surrounding air forms a second ascending airstream $Q_3$ undergoing the effect of the primary ascending airstream $Q_2$.

In a case where the airstream control plate 4 is not disposed, as shown in FIG. 6, the secondary ascending airstream $Q_{33}$ forms a vortex flow $Q_{34}$ ascending along the coating machine T while rotating under the effect of the rotational flow $Q_{31}$. However, in a case of disposing the airstream control plate 4, as shown in FIG. 2, since the secondary ascending airstream $Q_3$ is shut in the hopper housing 2 being interfered by the airstream control plate 4 before it forms a vortex flow under the effect of the rotational flow $Q_1$, a vortex flow ascending along the coating machine T while rotating is not formed.

As described above, there is no vortex flow tending to flow outwardly through the gap G between the coating machine T and the opening 3 and air between the hopper housing 2 and the airstream control plate 4 flows passing through just below the gap G while spreading outwardly to render the pressure inside the hoper 1 more negative than the outside in the portion of the gap G by a rotational flows $Q_1$, this forms a flow $Q_4$ sucked from the outside of the hopper housing 2 through the gap G.

Accordingly, the coating material particles are caused to flow by the rotational flow $Q_1$ and recovered in the hopper 1 and they do not whirl up and scatter from the gap G to the outside.

As has been described above, this embodiment can provide, an excellent effect capable of reliably preventing upward whirling of the coating material particles during cleaning without blowing out the shaping air by an extremely simple constitution of merely disposing the annular airstream control plate 4 in the hopper 1.

FIG. 3 is an explanatory view showing another embodiment of the invention in which those portions in common with FIG. 1 carry identical reference numerals for which detailed description will be omitted.

A hopper 11 for cleaning a coating machine of this embodiment is adapted such that an airstream control member 12 for shutting the ascending flow from the inside of a housing 2 through a gap G between a coating machine T and an opening 3 to the outside of the housing 2 by the rotation of a rotary atomizing head B comprises an airstream guide duct 14 formed with a flange portion 13 of such a size as closing the gap G, in which air is supplied continuously to a negative pressure zone 6 formed just below the rotary atomizing head B through the inside of the duct 14 as an air vent hole.

Then, the outer diameter of the flange portion 13 is made larger than the inner diameter of the opening 3 and the inner diameter of the airstream guide duct 13 is made smaller than the outer diameter of the rotary atomizing head B.

FIG. 4 is an explanatory view showing flows of air in the hopper 11 used for cleaning a coating machine.

Also in this embodiment, when the rotary atomizing head B is entered into the hopper 11 and rotated at a high speed, since rotational flow $Q_{11}$ in which air around the rotary atomizing head B rotates is formed and a negative pressure zone 6 is formed just below the rotary atomizing head B by the centrifugal force thereof, an ascending airstream $Q_{12}$ directing to the negative pressure zone 6 passing through the vent hole 5 of the airstream control plate 4 is formed and since air is supplied continuously to the negative pressure zone 6 by the ascending airstream $Q_{12}$, the rotational flow $Q_{11}$ is not eliminated.

In this case, since the ascending airstream $Q_{12}$ directing upwardly toward the rotary atomizing head B and air therearound are partitioned by way of the duct 12, a secondary ascending airstream directing upwardly along the coating machine T is not formed.

While the pressure on the upper surface of the flange 13 is made more negative than that on the lower surface thereof by the rotational flows $Q_{11}$ formed around the rotary atomizing head B, since they are partitioned by the flange portion 13, air on the lower surface is not sucked upwardly and a second ascending airstream is neither formed.

Accordingly, a vortex flow ascending along the coating machine T while rotating and flowing out from the opening 3 to the outside is not formed.

As described above, there is no vortex flow tending to flow outwardly through the gap G between the coating machine T and the opening 3, air between the hopper housing 2 and the flange portion 13 flows by a rotational flow $Q_{11}$ through a portion just below the gap G while spreading outwardly, and the pressure inside the hopper 11 becomes more negative than that at the outside in the portion of the gap G, to form a flow $Q_{13}$ that is sucked from the outside of the hopper housing 2 through the gap G thereof.

Accordingly, the coating material particles are caused to flow by the rotational flows $Q_{11}$ and recovered in the hopper 11 and they do not whirl up and scatter from the gap G to the outside.

As has been described above, also this embodiment provides an extremely excellent effect capable of reliably preventing upward whirling of coating material particles during cleaning by an extremely simple constitution of merely disposing the airstream control member 12 comprising the duct 14 formed with the flange portion 13 in the hopper 11 without blowing out shaping air.

FIG. 5 and FIG. 6 show a still further embodiment. Those portions in common with FIGS. 1 to 4 carry identical reference numerals for which detailed descriptions are to be omitted.

In a hopper 21 used for cleaning a coating machine of this embodiment, a contaminant deposition portion in the hopper 21 is made disposable to save cleaning labors.

That is, an upper surface cover 22 formed with an opening 3 is mounted detachably to a housing main body 24 forming a peripheral wall of a hopper housing 2, an airstream control plate (airstream control member) 25 is formed detachably to the upper surface cover 22, and the upper surface cover 22 and the airstream control plate 25 are made exchangeable.

The housing main body 24 is formed of a metal cylinder (for example, stainless steel tube) having a diameter of 30 to 40 cm opened at the upper surface and has pins 24*a* disposed at the upper end edge for fixing the upper surface cover 22.

The upper surface cover 22 is formed as an annular shape with a polyethylene board at 8× foaming ratio of 5 mm thickness and has fitting holes 22*a* formed at the peripheral edge thereof for inserting the pins 24*a* and recesses 22*b* formed at the periphery of the opening 3 for fixing the airstream control plate 25.

The airstream control plate 25 is formed as a substantially annular shape with polyethylene board at 8× foaming ratio of 3 mm thickness and has bent brackets 25*a* formed radially to be inserted in and fixed to the recesses 22*b* of the upper surface cover 22, and the airstream control plate 25 is attached to the cover 22 by inserting the brackets 25*a* while uprighting them vertically into the recesses 22*b*.

According to the constitution, in a case where the upper surface cover 22 and the airstream control plate 25 are contaminated upon maintenance, it may suffice to replace them with new ones and cleaning labors can be saved.

Further, upon detachment, since the upper surface cover 22 and the airstream control plate 25 are integrally detached from the housing main body 24 by merely raising the airstream control plate 25 such that pins 24*a* are disengaged, fingers may not be in contact with the airstream control plate 25 which is contaminated most severely. Upon attachment, since it may suffice only to raise the bent brackets 25*a* of the airstream control plate 25, insert them into the recesses 22*b* of the cover 22 and then align and fit the fitting holes 22*a* of the cover 22 to the pins 24*a*, tools, etc. are not necessary at all for exchange operation and the operation time can be shortened remarkably.

In the foregoing explanation, while description has been made to a case of using the annular airstream control plate 4 or 25, or the airstream guide duct 14 formed with the flange portion 13, it is not restricted only to the annular shape or the circular pipe duct but the shape is optional so long as it is in a shape of inhibiting the flow that ascends along the coating machine T.

INDUSTRIAL APPLICABILITY

The hopper for cleaning a coating machine according to the present invention can be used for such an application use as recovering a coating material or a thinner sprayed from a coating machine and preventing upward whirling thereof upon cleaning, in a coating booth, a rotary atomizing coating machine for coating works such as automobile bodies conveyed on a conveyor to the booth.

DESCRIPTION FOR REFERENCES

Figure 1:
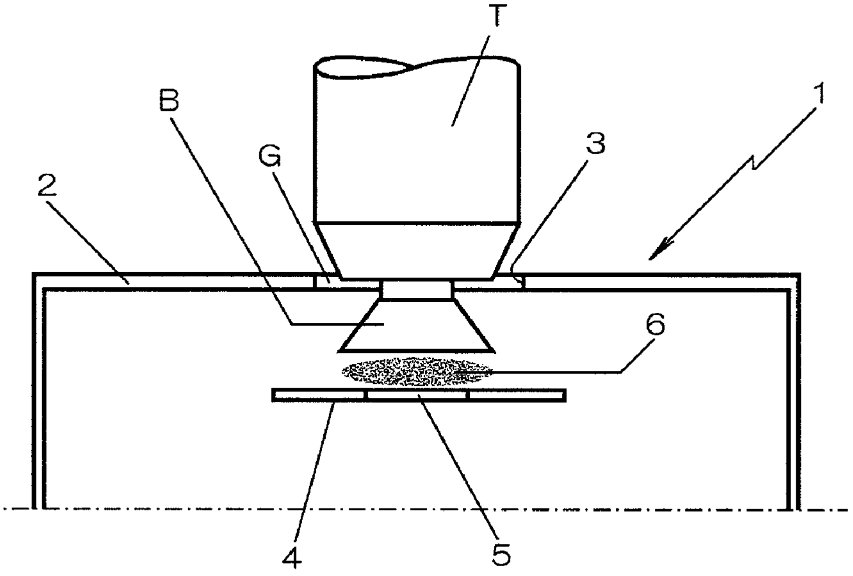
[FIG. 1] is an explanatory view showing a hopper used for cleaning a coating machine according to the present invention.
Figure 2:
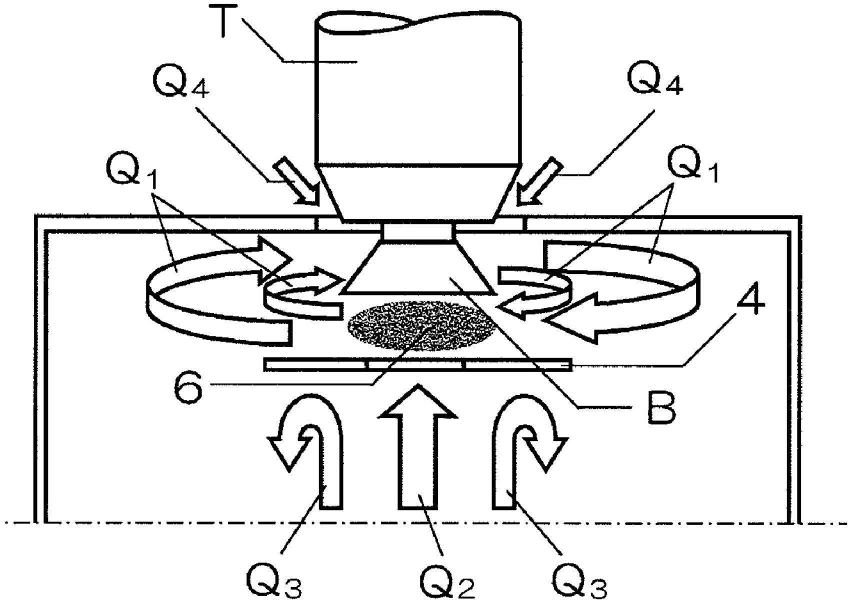
[FIG. 2] is an explanatory view showing flows of air therein.
Figure 3:
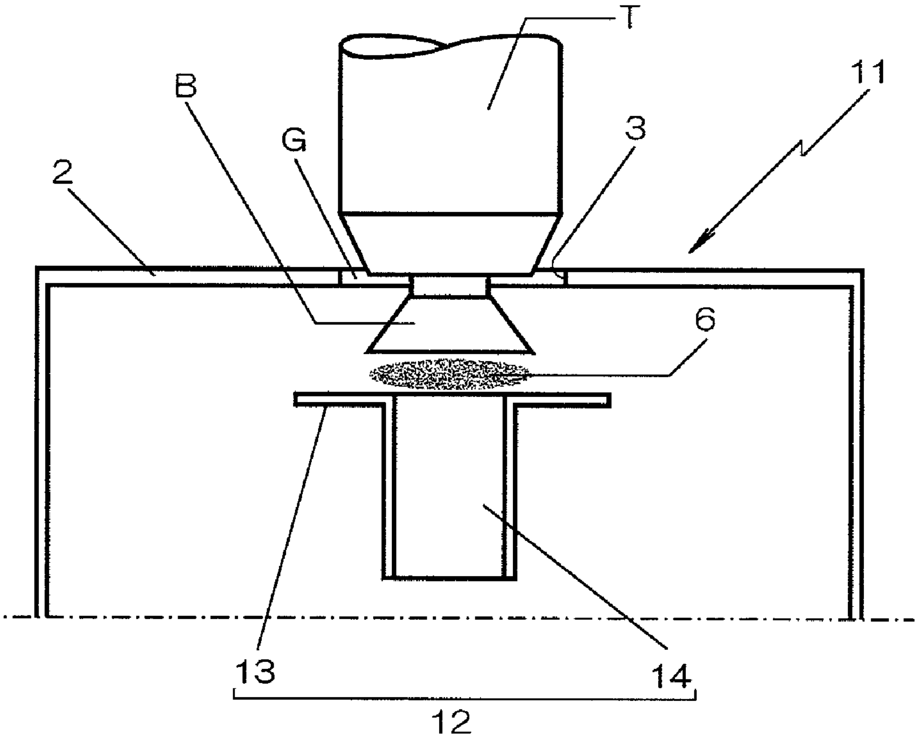
[FIG. 3] is an explanatory view showing another embodiment.
Figure 4:
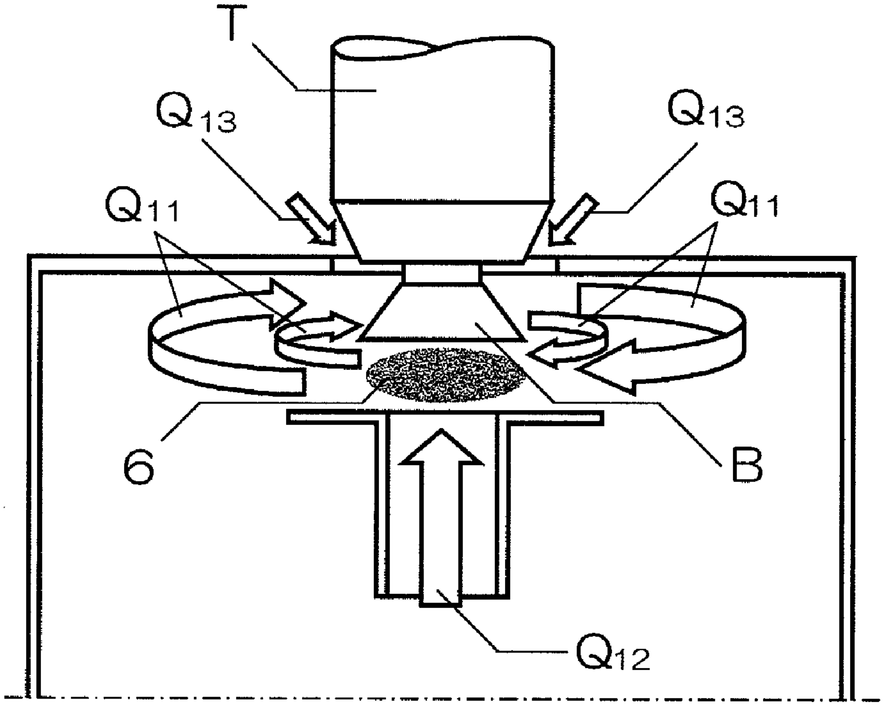
[FIG. 4] is an explanatory view showing flows of air therein.
Figure 5:
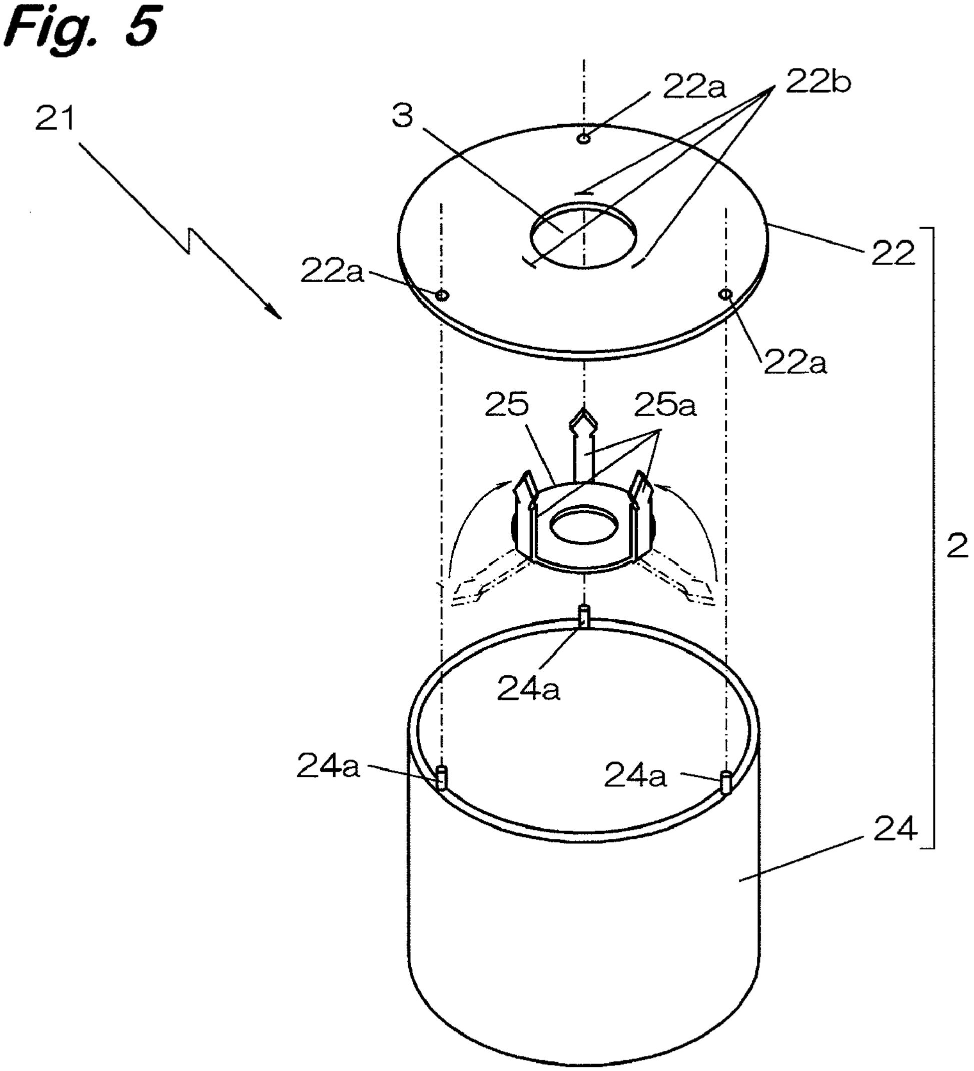
[FIG. 5] is an exploded assembling view showing a further embodiment.
Figure 6:
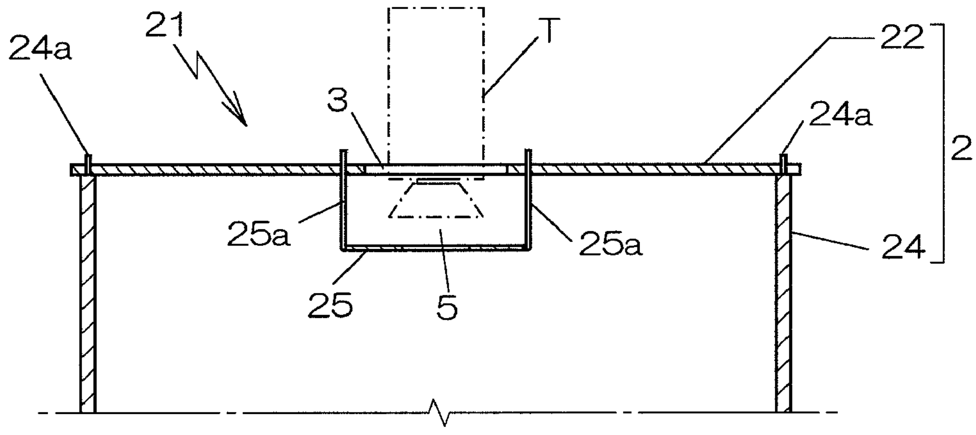
[FIG. 6] is a side elevational view thereof.
Figure 7:
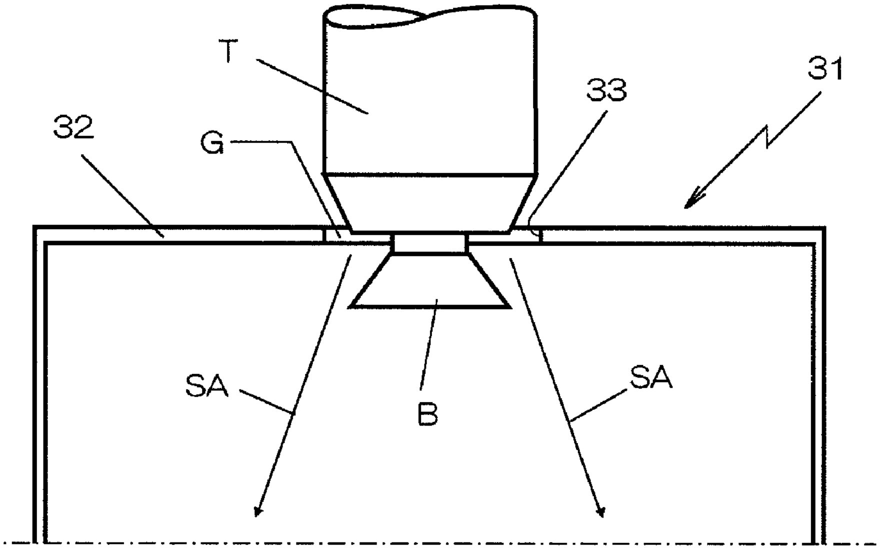
[FIG. 7] is an explanatory view showing an existent apparatus.
Figure 8:
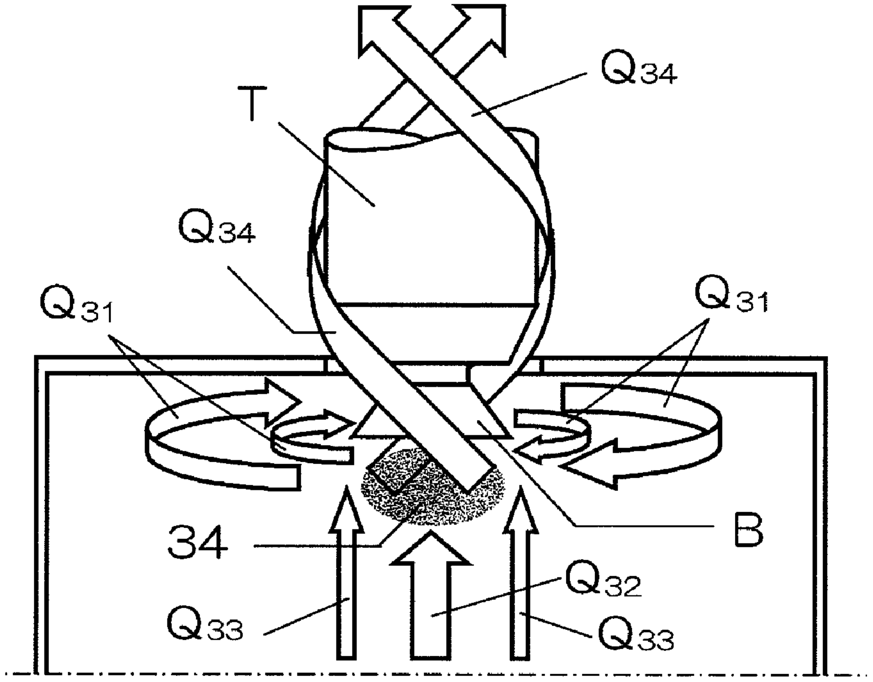
[FIG. 8] is an explanatory view showing flows of air.

1 hopper for cleaning a coating machine
2 hopper housing
3 opening
B rotary atomizing head
T coating machine
4 airstream control plate (airstream control member)
5 air vent hole
6 negative pressure zone
G gap

The invention claimed is:

1. A hopper used for cleaning a coating machine by extending a rotary atomizing head through an opening formed in an upper surface of a hopper housing and spraying a residual coating material and a thinner on the inside thereof upon cleaning a rotary atomizing coating machine by supplying the thinner thereto, comprising:

an airstream control member for preventing flow ascending toward the outside of the housing through a gap between the rotary atomizing head and the opening from the inside of the housing by the rotation of the rotary atomizing head positioned below a negative pressure zone formed just below the rotary atomizing head by the rotation thereof corresponding to the gap between the rotary atomizing head and the opening, and an air vent hole formed in the control member for supplying air to the negative pressure zone from a portion therebelow;

an upper surface cover formed with an opening mounted detachably to a housing main body forming the peripheral wall of the hopper housing, the airstream control member being formed detachably to the upper surface cover, and the upper surface cover and the air stream control member are exchangeable, the upper surface cover including a plurality of apertures positioned around the peripheral edge of the opening in the upper surface cover; and a plurality of bent brackets extending from the peripheral edge of the airstream control member and extending through respective said apertures formed around the peripheral edge of the opening in the upper surface cover to fix the airstream control member to the upper surface cover.

2. A hopper used for cleaning a coating machine according to claim 1, wherein the airstream control member is formed of an annular plate member of such a size as closing the gap between the rotary atomizing head and the opening.

3. A hopper used for cleaning a coating machine according to claim 1, wherein the airstream control member comprises an airstream guide duct having, formed at the upper end thereof, a flange portion of such a size as closing the gap between the rotary atomizing head and the opening, and is adapted to supply air through the inside of the duct as an air vent hole to the negative pressure zone.

* * * * *